(12) United States Patent
Gehringhoff et al.

(10) Patent No.: US 11,926,244 B2
(45) Date of Patent: Mar. 12, 2024

(54) METHOD FOR PRODUCING A BATTERY CARRIER FOR THE MOUNTING OF AN ELECTRIC BATTERY MODULE

(71) Applicant: Benteler Automobiltechnik GmbH, Paderborn (DE)

(72) Inventors: Ludger Gehringhoff, Paderborn (DE); Christian Handing, Langenberg (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 545 days.

(21) Appl. No.: 16/271,420

(22) Filed: Feb. 8, 2019

(65) Prior Publication Data

US 2019/0283627 A1     Sep. 19, 2019

(30) Foreign Application Priority Data

Mar. 19, 2018   (DE) .................. 10 2018 105 526.9

(51) Int. Cl.
*B60L 58/26*       (2019.01)
*B21D 22/26*       (2006.01)
(Continued)

(52) U.S. Cl.
CPC .............. *B60L 58/26* (2019.02); *B21D 22/26* (2013.01); *B60L 50/60* (2019.02);
(Continued)

(58) Field of Classification Search
CPC ...... H01M 50/20; H01M 50/30; H01M 50/60; H01M 50/233; H01M 50/262; H01M 10/613; H01M 10/625; H01M 10/3553; H01M 2220/20; H01M 50/231; H01M 10/6556; B60L 58/24; B60L 58/26; B60L 50/64; B60L 50/60; B60Y 2200/91;
(Continued)

(56) References Cited

U.S. PATENT DOCUMENTS 5,620,057 A * 4/1997 Klemen ................ B60K 11/06
                                                   180/68.5
9,533,600 B1 * 1/2017 Schwab .............. H01M 10/613
(Continued)

FOREIGN PATENT DOCUMENTS

CN       205282524 U    6/2016
CN       106410319 A    2/2017
(Continued)

*Primary Examiner* — Milton I Cano
*Assistant Examiner* — Mary G Henshaw
(74) *Attorney, Agent, or Firm* — Holland & Hart LLP

(57) ABSTRACT

The disclosure relates to a method for producing a battery carrier for an electric battery module of a vehicle configured to electrically operate, the method may include: providing a material blank with a blank region; providing a heat exchanger structure in the blank region, that comprises hollow channels that are inseparably connected to the material blank, wherein the hollow channels are provided to regulate a temperature of the electric battery module using a fluid; and forming the material blank into a support tray with a tray base configured to support the electric battery
(Continued)

module and with sidewalls that delimit the tray base at the sides of the tray base, wherein the tray base is developed from the blank region.

7 Claims, 14 Drawing Sheets

(51) Int. Cl.
*B60L 50/60* (2019.01)
*H01M 10/613* (2014.01)
*H01M 10/625* (2014.01)
*H01M 10/6556* (2014.01)
*H01M 50/231* (2021.01)

(52) U.S. Cl.
CPC ....... *H01M 10/613* (2015.04); *H01M 10/625* (2015.04); *H01M 10/6556* (2015.04); *H01M 50/231* (2021.01); *B60Y 2200/91* (2013.01); *B60Y 2306/05* (2013.01); *H01M 2220/20* (2013.01)

(58) Field of Classification Search
CPC .......... B60Y 2306/05; B60Y 2410/125; B21D 22/26; B60K 2001/0438; B62D 21/157

USPC .......................................................... 429/99
See application file for complete search history.

(56) References Cited

U.S. PATENT DOCUMENTS

| | | | |
|---|---|---|---|
| 2012/0082880 A1* | 4/2012 | Koetting | H01M 10/6557 29/890.039 |
| 2016/0263639 A1 | 9/2016 | Yoshida | |
| 2017/0271726 A1* | 9/2017 | Shen | H01M 10/653 |
| 2019/0131674 A1* | 5/2019 | Lu | H01M 10/6556 |
| 2019/0366876 A1* | 12/2019 | Cheadle | B60L 50/64 |

FOREIGN PATENT DOCUMENTS

| | | | | |
|---|---|---|---|---|
| CN | 107293661 A | | 10/2017 | |
| CN | 107464902 A | | 12/2017 | |
| DE | 10 2012 012 663 A1 | | 12/2013 | |
| DE | 102016209853 A1 | * | 12/2017 | ............ H01M 50/20 |
| EP | 2 650 945 A1 | | 10/2013 | |
| JP | 200073164 A | | 9/2001 | |
| JP | 2013133044 A | | 7/2013 | |
| WO | WO 2011/061072 A2 | | 5/2011 | |

* cited by examiner

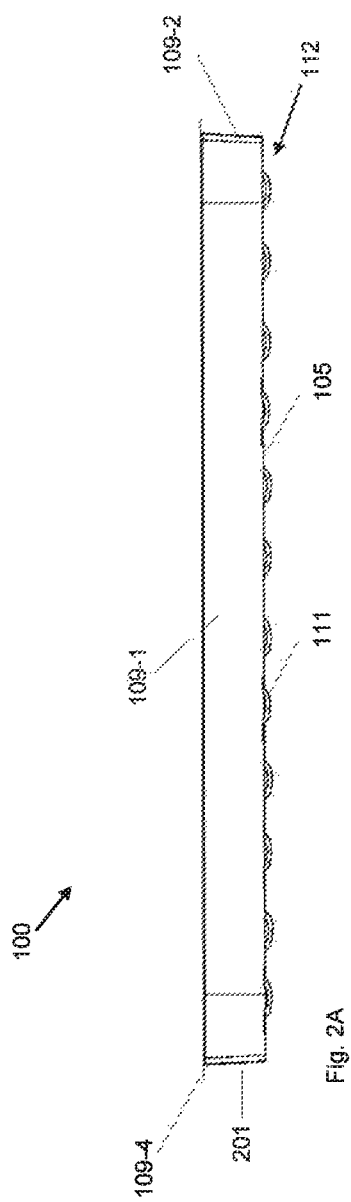
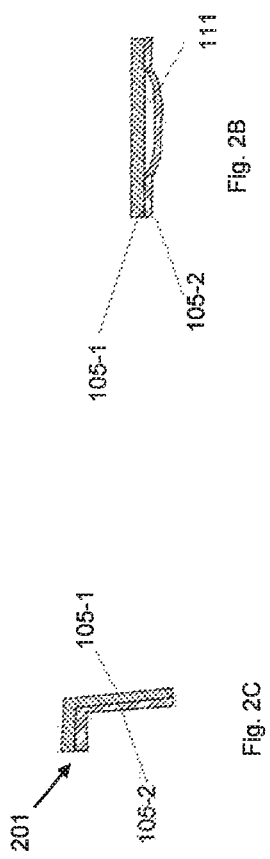
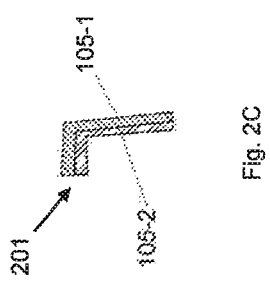
Fig. 2A
Fig. 2B
Fig. 2C

METHOD FOR PRODUCING A BATTERY CARRIER FOR THE MOUNTING OF AN ELECTRIC BATTERY MODULE

CROSS-REFERENCE TO RELATED APPLICATIONS

This application claims priority to German patent application No. 10 2018 105 526.9, entitled "Verfahren zum Herstellen eines Batterietragers zur Halterung eines elektrischen Batteriemoduls", and filed on Mar. 9, 2018 by the Applicant of this application. The entire disclosure of the German application is incorporated herein by reference for all purposes.

BACKGROUND

The present disclosure relates to the production of a battery carrier for the mounting of an electric battery module for an electrically operable vehicle.

For the mounting of electric battery modules, which for example can have one of more energy accumulators, use is customarily made of battery carriers which are mounted on the electrically operated vehicle. Such battery carriers are usually produced from a multiplicity of metal parts which are interconnected in a materially bonding or frictionally locking manner in order to obtain a support tray for supporting a battery module. The support tray is usually closed off by a cover after the installation of the battery module.

The previously described production of a battery carrier is costly, however. Moreover, the support trays which are produced in such way hamper efficient cooling of a battery module which is arranged therein.

SUMMARY

It is therefore the object of the present disclosure to create a production-efficient concept for a battery carrier which, moreover, enables efficient cooling of a battery module which is installed therein.

This object is achieved by means of the features of the independent claims. Advantageous examples of the disclosure are the subject matter of the dependent claims, of the description and of the attached figures.

The present disclosure is based on the knowledge that the above object can be achieved by means of a battery carrier which has a one-piece support tray for supporting a battery module.

The support tray can be formed from a workpiece consisting of sheet metal to form the support tray, for example by folding or deep drawing. The support tray comprises a double-walled base in which hollow channels are integrated. The double-walled base can be obtained for example by the use of a double-walled workpiece or by joining of another wall.

According to one aspect, the disclosure relates to a method for producing a battery carrier for an electric battery module of an electrically operable vehicle, involving: providing a material blank with a blank region; providing a heat exchanger structure in the blank region which has hollow channels which are inseparably connected to the material blank, wherein the hollow channels are provided for temperature regulation of the electric battery module by means of fluid; and forming of the material blank to form a support tray with a tray base for supporting the electric battery module and with sidewalls which delimit the tray base at the sides, wherein the tray base is developed from the blank region.

In one example, the heat exchanger structure forms a heat exchanger.

In one example, the forming comprises the folding of the material blank, wherein two adjacent sidewalls are then interconnected in a materially bonding, especially fluid tight, manner.

In one example, the forming comprises the deep drawing of the material blank.

In one example, the heat exchanger structure with the hollow channels is provided before the forming of the material blank, wherein the mechanical material blank is formed mechanically with the heat exchanger structure in order to obtain the support tray.

In one example, the material blank is formed with double walls, especially as a roll bonded blank, wherein the hollow channels of the heat exchanger structure are provided by widening out, especially by inflation with air, of the double-walled material blank in the blank region before or after the forming into the support tray.

In one example, a wall of the double-walled material blank which faces the interior of the support tray is thinner than a wall of the double-walled material blank which faces away from the interior of the support tray. As a result, this achieves the effect of the hollow channels of the heat exchanger structure being formed in the interior of the support tray and the support tray being more easily foldable. The thicker wall also serves as an underride protector or stone guard.

In one example, one wall of the double-walled material blank which faces the interior of the support tray is thicker than a wall of the double-walled material blank which faces away from the interior of the support tray. As a result, this achieves the effect of the hollow channels being formed outside the support tray and an even, flat support surface being provided for the battery modules.

In one example, all the hollow channels of the heat exchanger structure are formed exclusively in the double-walled blank region.

In one example, the material blank has a further double-walled blank region, with flat abutting walls, which adjoins the double-walled blank region at the sides, wherein at least one sidewall is formed by mechanical forming of the further blank region, especially with flat abutting walls.

In one example, at least one hollow channel of the heat exchanger structure is formed in a further double-walled blank region of the material blank which adjoins the blank region, especially by widening out the material blank, wherein at least one sidewall is formed by mechanical forming of the further blank region with the at least one hollow channel.

In an alternative example, the heat exchanger structure, after the forming, especially after the folding of the material blank, is connected to the tray base, especially by means of a materially bonding connection.

In one example, the tray base with the connected heat exchanger structure is formed with double walls, wherein the sidewalls are formed with single walls or double walls. An advantage of single-walled sidewalls is the simpler formability, especially the simpler foldability to form the support tray.

In one example, at least one first sidewall is formed by folding the material blank and is configured with an angled joint plate, wherein the angled joint plate is connected to a second sidewall, which adjoins the first sidewall, in a materially bonding, especially fluid tight, manner.

In one example, the hollow channels of the heat exchanger structure are formed parallel to each other, or are of a serpentine, or helical or coil-like form or, at least in certain sections, of a circular or wave-like form.

In one example, in the blank region the hollow channels have annular, especially annularly longitudinally extended hollow channel cells with sections which are fluidically branched off parallel to each other and then brought together, wherein annular hollow channel cells of adjacent hollow channels have at least one common section.

In one example, an opening of a first hollow channel is provided with a fluid inlet connector after the mechanical forming, wherein an opening of a second hollow channel is provided with a fluid outlet connector.

According to a second aspect, the disclosure relates to a battery carrier for supporting at least one electric battery module for an electrically operable vehicle, having: a support tray which is formed from a material blank, which has double walls at least in certain sections, wherein the support tray has a double-walled base for supporting the electric battery module and also sidewalls, especially with single walls or double walls, which delimit the double-walled tray base at the sides; and a heat exchanger structure with hollow channels which are formed in the double-walled tray base and through which a fluid can be passed for temperature regulation of the electric battery module.

In one example, the double-walled material blank is a roll bonded blank.

The term roll "bonded blank" in the scope of the disclosure means that an at least double-layered sheet metal blank is formed with a first layer, a second layer and separating means arranged locally in between them, wherein in regions which are not provided with separating means a flat, materially bonding, especially metallurgical connection of the layers exists. The regions of the roll bonded blank which are provided with separating means are later widened out or inflated to form hollow channels, especially after the forming of the material blank into the support tray.

The material blank, especially the roll bonded blank, is preferably formed from at least one aluminium alloy. However, it is also possible to connect a stainless steel layer to a layer consisting of steel material. Moreover, two thinner stainless steel layers can be connected as a roll bonded blank to a thicker layer consisting of steel material in order to achieve an improved corrosion protection around the fluid-conducting hollow channel and also around the support tray itself and the battery module.

In one example, the heat exchanger structure is formed exclusively in the double-walled tray base, wherein the sidewalls are formed with single walls or double walls.

In one example, the hollow channels of the heat exchanger structure are formed parallel to each other, or are of a serpentine, or helical or coil-like form or, at least in certain sections, of a circular or wave-like form.

In one example, the double-walled material blank is a blank which is assembled by laser welding, soldering, adhesive fastening or roller seam welding.

In one example, the heat exchanger structure is formed with at least one hollow channel in at least one double-walled sidewall.

In one example, the double-walled material blank is folded to form the double-walled support tray, especially folded with the configured heat exchanger structure.

In one example, the heat exchanger structure is formed exclusively in the double-walled tray base, wherein the sidewalls are formed with single walls or double walls.

The batter carrier is preferably produced by means of the method according to the first aspect.

BRIEF DESCRIPTION OF THE DRAWINGS

Further examples of the disclosure are explained in more detail with reference to the attached figures. In the drawing:

FIGS. 2A, 2B and 2C show the battery carrier in one example;

DETAILED DESCRIPTION

Figure 1:
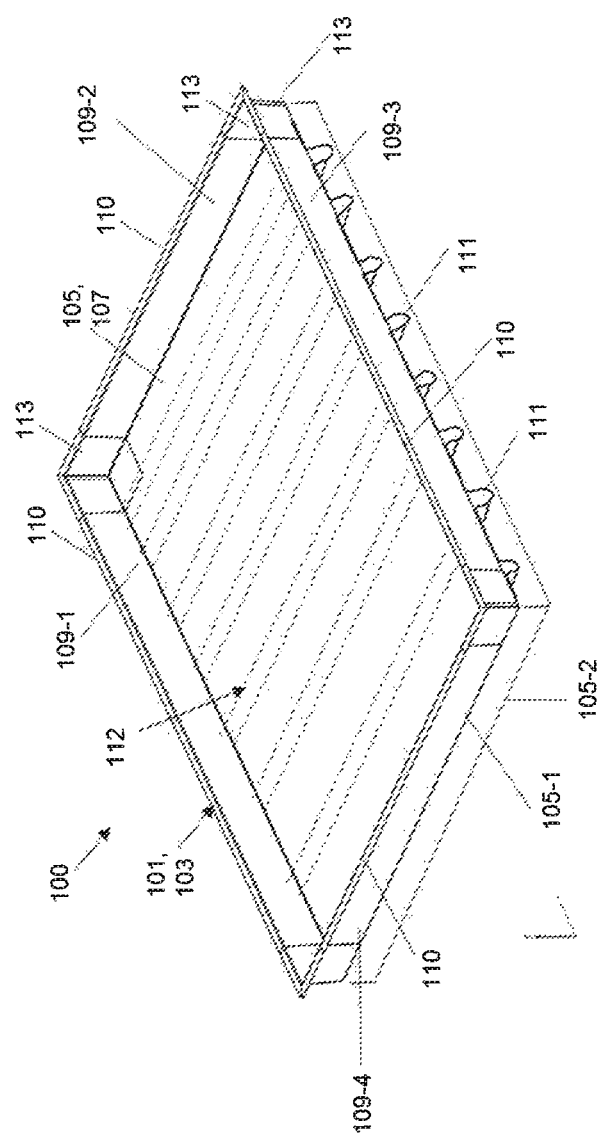
FIG. 1 schematically shows a battery carrier in one example.

FIG. 1 schematically shows a battery carrier 100 for battery modules, not shown in FIG. 1, of an electrically operable vehicle.

The battery carrier 100 has a support tray 101 which is formed by a mechanical forming of a material blank 103. In the example shown in FIG. 1, the material blank 103 is formed by folding. The mechanical forming can alternatively or additionally also comprises deep drawing of the material blank 103.

The support tray 101 comprises a tray base 105 which is created from a blank region 107 of the material blank 103. The tray base 105, in the case of forming by folding of the material blank 103, can correspond to the blank region 107.

If the support tray 101 is produced from the material blank 103 by means of deep drawing, then the original blank region 107 of the material blank 103 and the tray base 105 can be different in size.

The support tray 101 also comprises sidewalls 109-1, 109-2, 109-3, 109-4 which delimit the tray base 105 at the sides and extend at an angle from the tray base 105. The sidewalls 109-1, 109-2, 109-3, 109-4 can be produced by folding or bending over or deep drawing of the material blank 103.

The sidewalls 109-1, 109-2, 109-3, 109-4 as an option can have an angled flange 110 in each case, as shown schematically in FIG. 1. The flange 110 can serve for the fastening of a cover, not shown, on the support tray 101.

The sidewalls 109-1, 109-2, 109-3, 109-4 are interconnected in a materially bonding manner, for example by welding or adhesive fastening, and in a fluid tight manner. As a result of the fluid tight connection, the connection points of the sidewalls 109-1, 109-2, 109-3, 109-4 are watertight and/or gastight.

As an option, the sidewalls 109-1, 109-2, 109-3, 109-4, as indicated by way of example in FIG. 1, can have corner connectors 113 arranged in the corner regions which are provided for the materially bonding and fluid tight connection of the sidewalls 109-1, 109-2, 109-3, 109-4.

The tray base 105 is of double-walled design, with a first wall 105-1, which faces the interior of the support tray 101, and second wall 105-2, which faces away from the interior of the support tray 101.

The first base wall 105-1 and the second base wall 105-2 can be walls of a roll bonded blank from which the material blank 103 is produced in one example.

The first base wall 105-1 in one example can be joined to the second base wall 105-2 in a materially bonding manner, e.g., by adhesive fastening or welding. Alternatively, the second base wall 105-2 can be joined to the first base wall 105-1 in a materially bonding manner.

Hollow channels 111, which are shown schematically in FIG. 1, are formed in the tray base 105. The hollow channels 111 form a heat exchanger structure 112. The heat exchanger structure 112 forms an integrated heat exchanger in one example.

The hollow channels 111 are produced in one example by means of inflation of the material blank 103, which is formed as a roll bonded blank, preferably before the forming of the material blank 103 to form the support tray 101. In another example, however, the hollow channels 111 can also be produced by means of inflation of the material blank 103, which is formed as a roll bonded blank, after the forming of the material blank 103 to form the support tray 101. In both examples, the hollow channels 111 are developed by a deforming of the first base wall 105-1 and/or the second base wall 105-2.

The first base wall 105-1 can be formed thinner than the second base wall 105-2. In this case, the hollow channels 111 are arched into the interior of the support tray 101, different to which is shown by way of example. An advantage of this example is the energy-efficient heat absorption by a fluid which can be passed through the hollow channels 111. Also, the thicker second base wall 105-2 protects the interior of the support tray 101. The thinner first base wall 105-1, moreover, simplifies the folding over of the sidewalls 109-1 to 109-4 toward the interior of the support tray 101.

The first base wall 105-1, however, can also be formed thicker than the second base wall 105-2. In this case, the hollow channels 111, as shown, are arched outwards. As a result, the tray base 105 can provide a flat, or flat at least in certain sections, surface for the mounting of a battery module.

The hollow channels 111 can extend longitudinally between the for example shorter sidewalls 109-2, 109-4. The hollow channels 111, however, as indicated in FIG. 1, can also extend longitudinally between the longer sidewalls 109-1, 109-3.

The hollow channels 111 in one example can be of serpentine or spiral or coil-like form.

The hollow channels 111 in one example are fluidically connected to collecting lines, not shown, as a result of which the heat exchanger structure 112 can be connected to a fluid circuit and consequently the support tray 101 and the battery module can be temperature regulated.

In one example, the hollow channels 111 can be formed for example by tubes or by one or more tube coils which are joined to the second base wall 105-2 in a materially bonding manner.

In one example, the hollow channels 111 together with the second base wall 105-2 can be joined to the first base wall 105-1 in a materially bonding manner. In another example, the hollow channels 111 together with the first base wall 105-1 can be joined to the second base wall 105-2 in a materially bonding manner.

Shown in FIGS. 2A, 2B and 2C is the battery carrier in one example. Shown in FIG. 2A is a cross section along an intersection extending between the sides 109-2 and 109-4.

The hollow channels 111 are preferably produced by means of roll bonding in which the hollow channels are produced by inflation of the double-walled material blank 103. It is also possible to produce the double-walled material blank 103 by means of a soldering process or a welding process in which the second base wall 105-2, which is formed with the hollow channels 111, is joined to the first base wall 105-1. The first base wall 105-1 can be thicker than the second base wall 105-2 in each case.

Shown in FIG. 2B by way of example is a cross section of a hollow channel 111 in which the material join is shown.

In one example, the material blank 103 is formed as a double-walled roll bonded blank. In this case, the hollow channels 111 extend for example exclusively in the region of the tray base 105. The hollow channels 111 can be created before the forming of the material blank 103 to form the support tray 101 or afterwards for example by inflation. As a result, the second base wall 105-2 is arched outwards in each case in the region of the hollow channels 111.

The sidewalls 109-1 to 109-4 can be free of hollow channels 111 and be of single-walled or double-walled design.

Shown in FIG. 2C is an example in which when a double-walled roll bonded blank is used the sidewalls 109-1 to 109-4, especially in the region of the corners 201, are of double-walled form with flat abutting walls 105-1, 105-2.

The sidewalls 109-1 to 109-4 can be formed before or after the forming of the hollow channels 111, for example by means of folding or deep drawing of the material blank 103.

Figure 3:
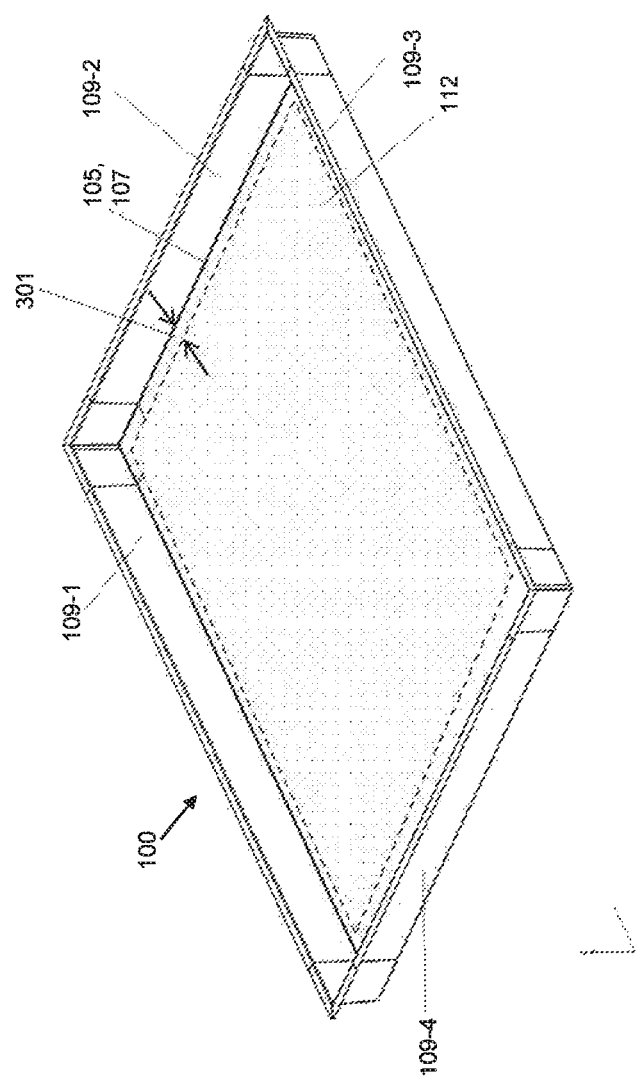
FIG. 3 schematically shows the battery carrier in one example.

FIG. 3 shows an example of the battery carrier 100 in which the heat exchanger structure 112 is joined in a materially bonding manner, for example welded, to the first wall 105-1 of the tray base 105. This can be carried out in the course of a separate joining process before the forming, for example folding, of the material blank 103.

The heat exchanger structure 112 can for example with the second base wall 105-2, which is not shown in FIG. 3, be joined to the first base wall. As a result, a double-walled structure of the tray base 105 is created. The resulting cross-sectional structure can correspond to the cross-sectional structure shown in FIG. 2B.

The sidewalls 109-1 to 109-4 are for example of single-walled design.

The heat exchanger structure 112 in one example defines a cooling region which at the sides has a border region or a distance 301 to the sidewalls 109-1 to 109-4. The distance 301 defines a contact surface for a bending tool for the folding over or bending over of the sidewalls 109-1 to 109-4, as a result of which the sidewalls 109-1 to 109-4 can be bent or folded after the joining of the heat exchanger structure 112.

Figure 4:
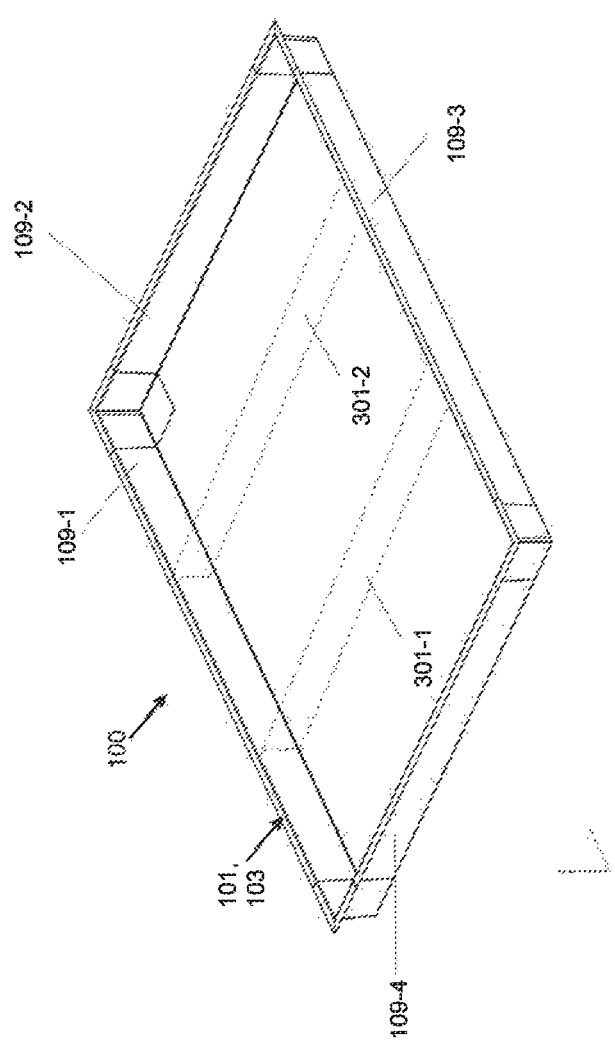
FIG. 4 schematically shows the battery carrier in one example.

FIG. 4 shows the battery carrier 100 in an example in which provision is made for inner walls or transverse walls 301-1, 301-2 which extend inside the support tray 101 for example between oppositely disposed sidewalls 109-1, 109-3 and are connected to the sidewalls 109-1, 109-3 in a materially bonding manner, for example by welding of adhesive fastening. Support regions or support recesses for a multiplicity of battery modules are defined by the transverse walls 301-1, 301-2. The transverse walls, for example for the purpose of tolerance compensation or crash energy degradation, can also be connected indirectly to the sidewalls, or connected via connecting elements or deformation elements (not shown).

In one example, the transverse walls 301-1, 301-2 have single walls and are free of hollow channels 111.

Figure 5:
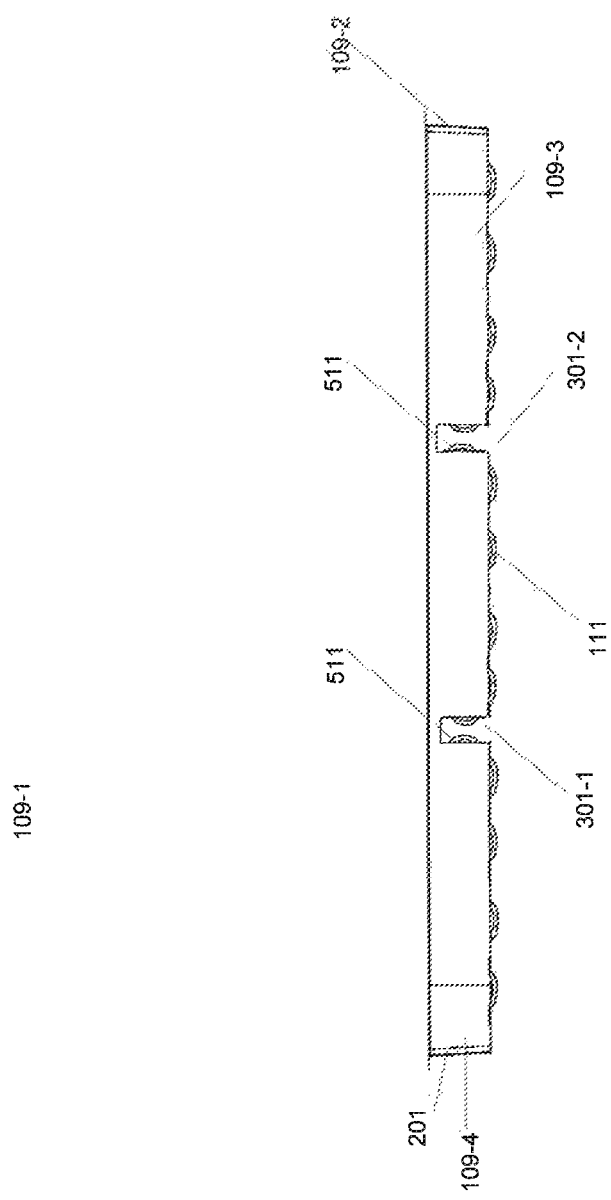
FIG. 5 schematically shows the battery carrier in one example.

In the example shown in FIG. 5, the heat exchanger structure comprises hollow channels 511 which are formed in the transverse walls 301-1, 301-2. To this end, the schematically indicated transverse walls 301-1, 301-2 can for example be designed with double walls and be roll bonded blanks. In this case, the hollow channels 511 are realised for example by inflation.

The transverse walls 301-1, 301-2, however, can also be formed by the materially bonding joining together of two material blanks, wherein at least one or both of the material blanks have formed hollow channels 511. The hollow channels 511, as tubes, can also be fastened in a materially bonding manner to a material blank.

The transverse walls 301-1, 301-2 can be formed from a folded over material blank. In this way, the transverse walls 301-1, 301-2 can form half-open profiles so that the hollow channels 511 are accessible from the outside, as is indicated in FIG. 5. As a result, the hollow channels 511 can be connected to a fluid circuit in a simpler manner.

In one example, the hollow channels 511 are formed in a single layer in the respective sidewall 109-1 to 109-4 and extend in the same direction as the hollow channels 111.

In one example, the hollow channels 511 in the respective sidewall are formed in a double layer and lie opposite each other and extend in the same direction as the hollow channels 311. In this case, the left-hand side hollow channels 511 of a transverse wall 301-1, 301-2 can be fluidically connected to hollow channels 311 which lie on the left of these left-hand side hollow channels 511. Correspondingly, the right-hand side hollow channels 511 of a transverse wall 301-1, 301-2 can be fluidically connected to hollow channels 311 which lie on the right of the right-hand side hollow channel 511.

The hollow channels 511 are fluidically connected to the hollow channels 111 for example by means of fluid connectors or welded or adhesively fastened pipe connections.

In one example, when a double-walled roll bonded blank is used, the sidewalls 109-1 to 109-4 can be formed with double walls with flat abutting walls 105-1, 105-2, especially in the region of the corners 201, as is shown for example in FIG. 2C.

In another example, the hollow channels 511 can also be formed in the sidewalls 109-1 to 109-4.

Figure 6A:
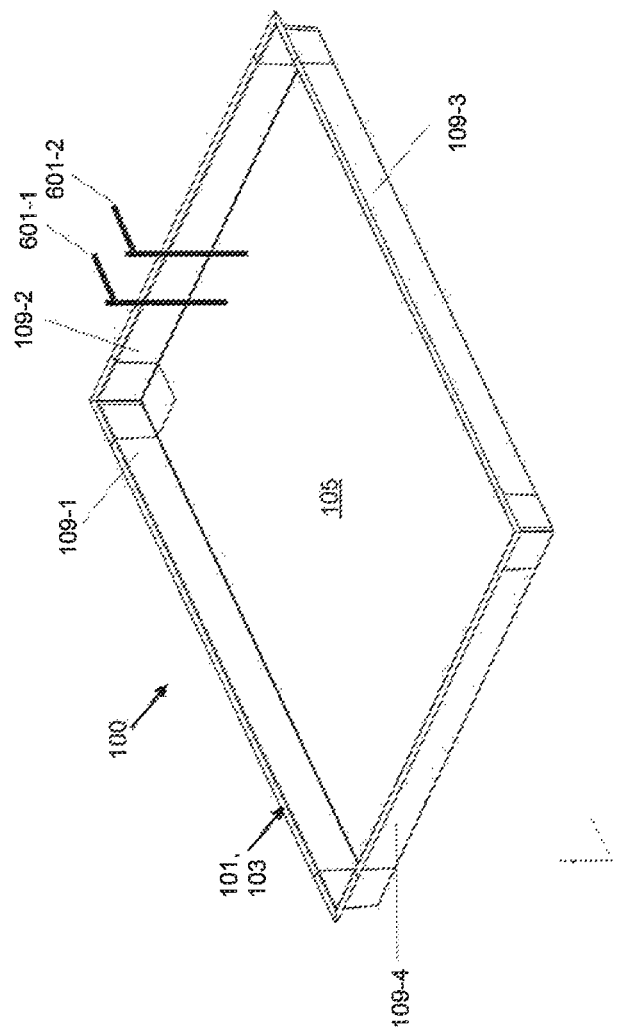
FIGS. 6A, 6B schematically show the battery carrier in one example.
Figure 6B:
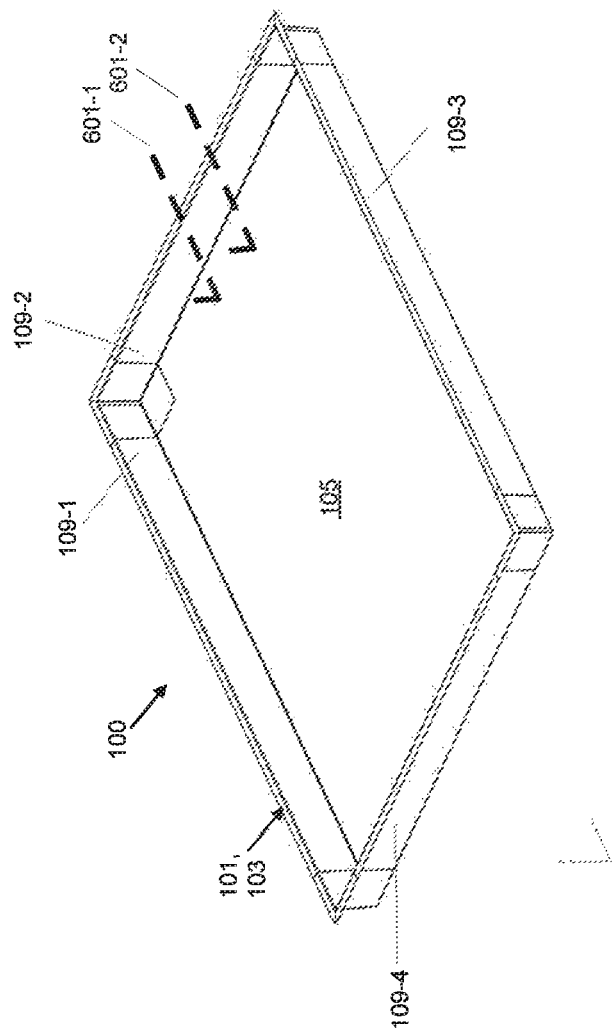

As is shown schematically in FIGS. 6A and 6B, the heat exchanger structure 112, which is not shown, can be connected to a fluid circuit with a fluid inlet 601-1 and a fluid outlet 601-02.

The fluid inlet 601-1 and the fluid outlet 601-02 in the example shown in FIG. 6A can be directed through a cover, which is not shown in FIG. 6A, and via the tray base 105 can be connected to the hollow channels 311 of the heat exchanger structure 112.

The fluid inlet 601-1 and the fluid outlet 601-02 can be directed through the tray base 105 on the bottom side in the example shown in FIG. 6B.

The fluid inlet 601-1 and the fluid outlet 601-02 can also be in contact with the hollow channels 311 on the end face side, however, if these hollow channels have accessible openings on the end face, as is shown by way of example in FIG. 1.

The fluid inlet 601-1 and the fluid outlet 601-02 can be configured in each case as fluid connectors 601-1, 601-2.

For the connecting of the fluid inlet 601-1 and the fluid outlet 601-02, connecting holes, which are not shown, to the hollow channels 111 can be introduced, which can be cooling channels of the heat exchanger structure 112 which operates as the heat exchanger. The connecting holes are formed on one side of the respective tray base wall 105-1, 105-2 or in a collector which is additionally formed as a hollow channel.

The fluid connectors 601-1, 601-02 can be formed during the direct inflation process by withdrawing a hole punch at the moment at which pressure application still prevails in the roll bonding process for the forming of the hollow channels 111. For the hydraulic perforating, the roll bonded metal sheet, which forms the material blank 103, can be placed in a punching die or embossing die before the inflation.

Using a punch provided with a knife-edge ring, the hole for the respective inlet and outlet connector 601-1, 601-2 can be pre-punched in the metal sheet of the tray base 105 provided for it. Provision can also made in the punching die for a backstop which absorbs the counter force during the forming process. During the inflation process, the connecting hole is formed by withdrawal of the punch.

The forming of the connecting holes of the connectors 601-1, 601-2 can also be carried out during the thermal inflation process of the hollow channels 111.

Figure 7:
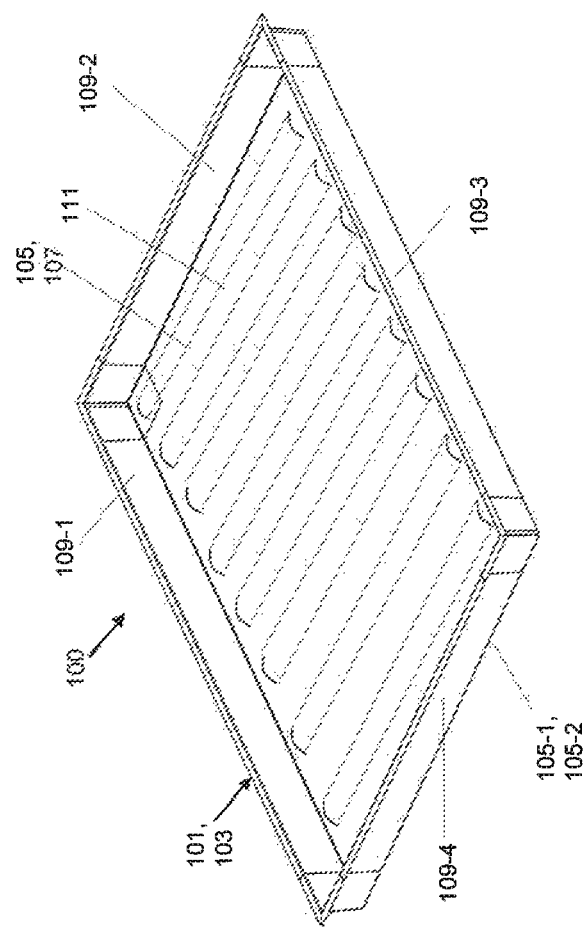
FIG. 7 schematically shows the battery carrier in one example.

FIG. 7 shows an example of the battery carrier 100 in which in contrast to the example shown in FIGS. 2A, 2B and 2C the hollow channels 311 are arched inwards. To this end, the first base wall 105-1 is for example thinner than the second base wall 105-2.

Figure 8:
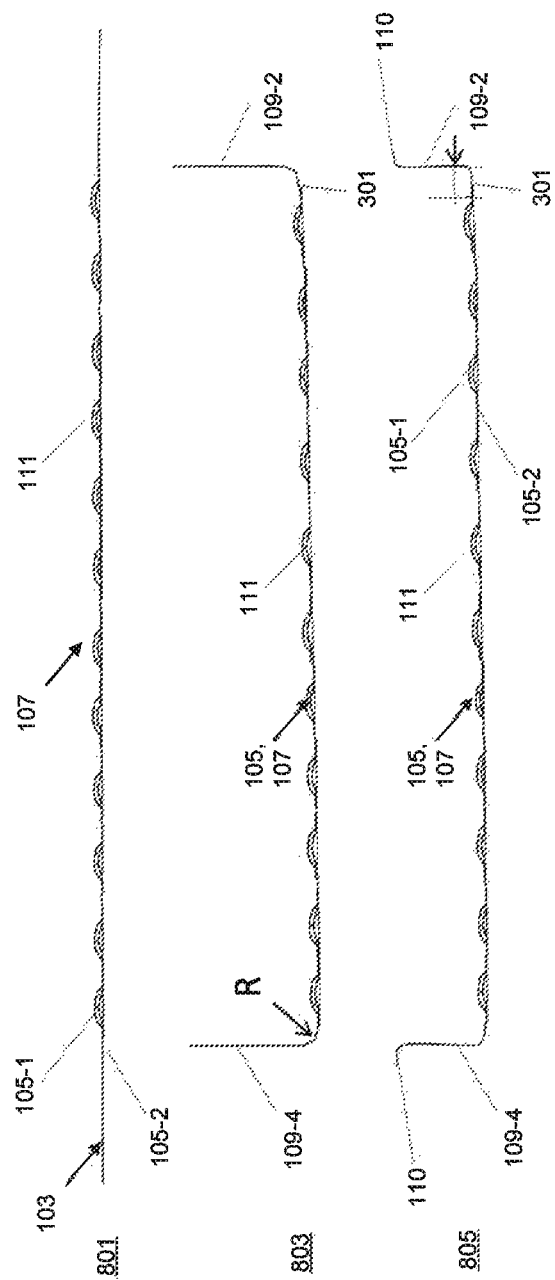
FIG. 8 shows exemplary production steps for producing the battery carrier.

Shown in FIG. 8 are exemplary production steps for producing the battery carrier 100 shown in FIG. 7.

In step 801, the material blank 103 with formed out hollow channels 111 in the blank region 107 is provided. The material blank 103 can for example be a roll bonded blank in which hollow channels 111 have been formed in advance for example by inflation.

The material blank 103, however, can be formed from separate base walls 105-1, 105-2, which are connected in a materially bonding manner, with formed out hollow channels 111.

After step 801, in step 803, the sidewalls 109-1 to 109-4 are bent over or folded over by means of a bending tool, which is not shown. For this purpose, the bending tool can extend in the border region in which no hollow channels 311 are formed. The bend radius R is for example smaller than the doubled wall thickness of one of the base walls 105-1, 105-2. The sidewalls 109 include an angle of approximately 90° with the base wall 105. As a result of the bend radius and angle, an improved utilisation of space for the battery modules is provided.

In step 803, the sidewalls 109-1 to 109-4 can be interconnected in a materially bonding and media-tight, i.e., fluid tight, manner.

Alternatively, the sidewalls 109-1 to 109-4 can be formed by means of deep drawing. In this case, the bend radius is between three times and ten times a thickness of one of the base walls 105-1, 105-2. A subsequent connecting of the sidewalls can therefore be dispensed with.

After step 803, the optional step 805 is carried out, in which step the respectively angled flange 110 is bent by means of a bending tool or formed by means of deep drawing.

Figure 9A:
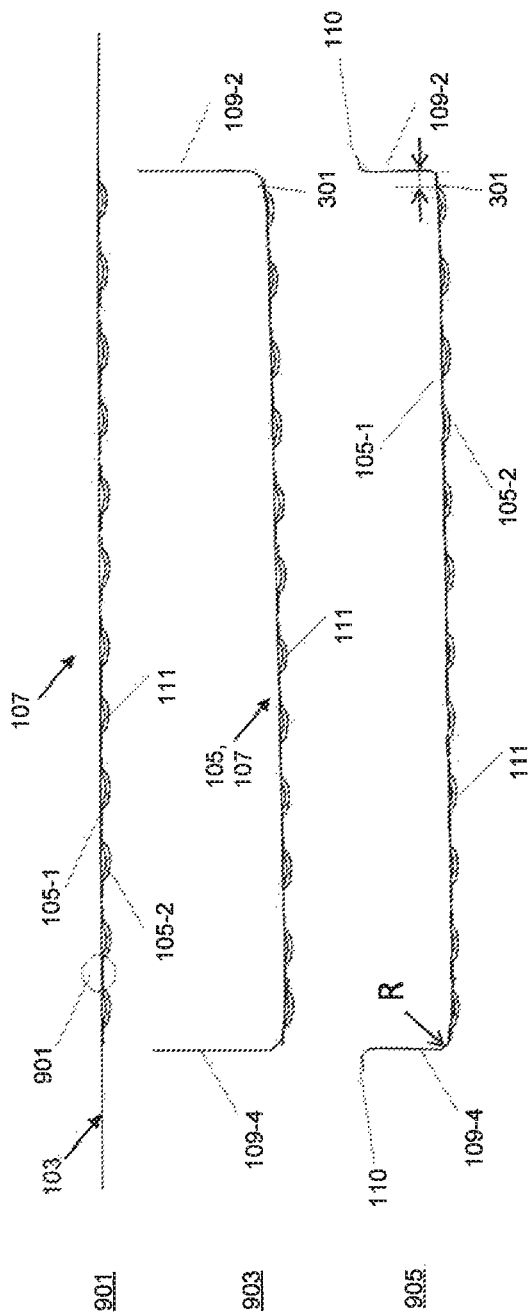
FIG. 9A shows exemplary production steps for producing the battery carrier.

Shown in FIG. 9A are exemplary production steps for producing the battery carrier 100 which is shown for example in FIG. 2A.

In step 901, the material blank 103 with the formed out hollow channels 111 in the blank region 107 is provided. The material blank 103 can for example be a roll bonded blank in which hollow channels 111 have been formed in advance for example by means of inflation.

The material blank 103, however, can be formed from separate base walls 105-1, 105-2, which are connected in a materially bonding manner, having formed out hollow channels 111.

After step 901, in step 903, the sidewalls 109-1 to 109-4 are bent over or folded over by means of a bending tool, which is not shown. For this purpose, the bending tool can extend in the border region 301 in which no hollow channels 311 are formed. The bend radius R is for example smaller than the doubled wall thickness of one of the base walls 105-1, 105-2.

In step 903, the sidewalls 109-1 to 109-4 can be interconnected in a materially bonding and media-tight, i.e., fluid tight, manner.

Alternatively, the sidewalls 109-1 to 109-4 can be formed out by means of deep drawing. In this case, the bend radius is between three times and ten times a thickness of one of the base walls 105-1, 105-2.

Carried out after step 903 is the optional step 905 in which the respectively angled flange 110 is bent by means of a bending tool or by means of deep drawing.

Figure 9B:
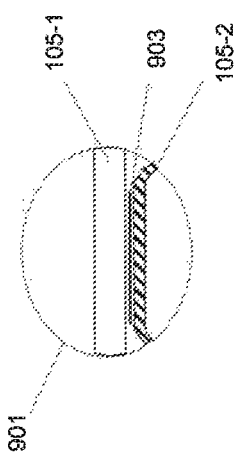
FIG. 9B shows the material join.

Shown in FIG. 9B is a material connection 901, with the second base wall 105-2, which for example is thinner than the first base wall 105-1. A connecting layer 903, for example a materially bonding layer, such as an adhesive layer or a welded layer, can be arranged between the base walls 105-1, 105-2. In the case of a roll bonded blank it can be materially bonding, flat, metallurgical connection without solder or welding additive.

Figure 10:
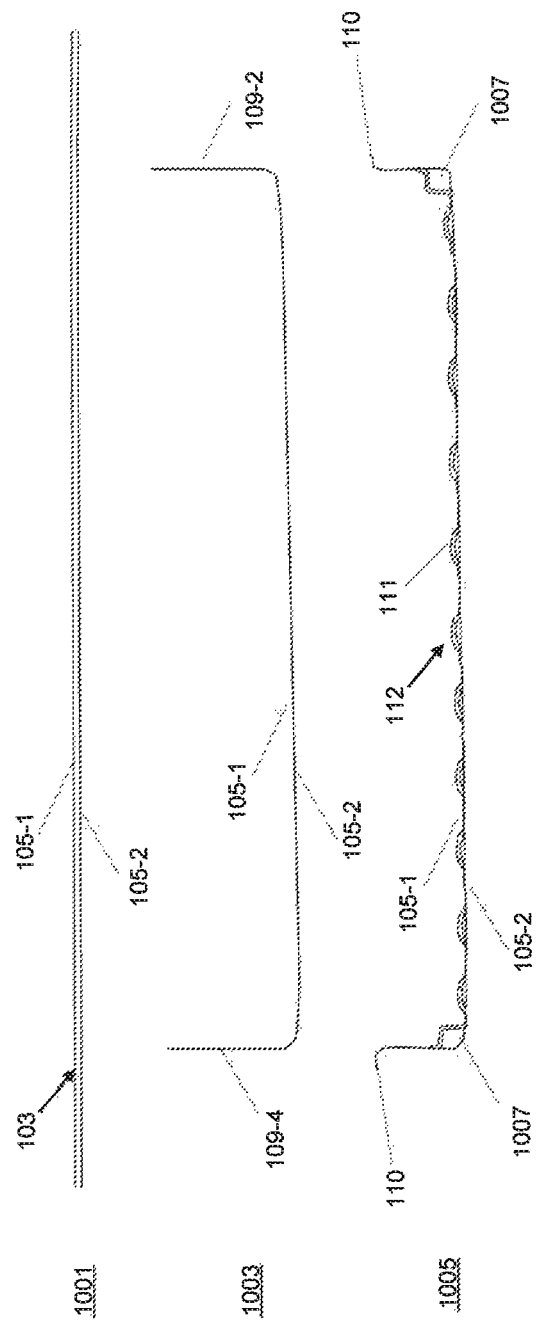
FIG. 10 shows exemplary production steps for producing the battery carrier.

Shown in FIG. 10 in one example according to FIG. 7 are exemplary production steps 1001, 1003, 1005 for producing the battery carrier 100 with the forming of the hollow channels 111. In contrast to the examples shown in FIG. 8 and FIG. 9, in the example shown in FIG. 10, the forming of the hollow channels 111 is carried out after the forming of the material blank 103 to form the support tray by means of folding or deep drawing.

In step 1001, the material blank 103 is provided for example as a double-walled roll bonded blank.

After step 1001, in step 1003, the sidewalls 109-1 to 109-4 are bent over or folded over by means of a bending tool, which is not shown. For this purpose, the bending tool can extend in the border region 301 in which no hollow channels 311 are formed. The bend radius R is for example smaller than the doubled thickness of one of the base walls 105-1, 105-2.

After step 1003, in step 1005, the hollow channels 111 are formed for example by means of inflation or other widening out of the material blank 103 which is formed as a roll bonded blank. In this case, additional cavities 1007, which for example are not cavities of the cavity structure 112, can be created between the sidewalls 109-1 to 109-4 and the base wall 105. The additional cavities 1007 for example have a larger cross section than the cavities 111 of the cavity structure 112. The additional cavities 1007 can be provided for absorbing impact energy and form crash structures. The additional cavities or hollow channels 1007 can also increase the lateral rigidity of the battery carrier 100. The additional cavities 1007 can also form a fluid collector.

For the creation of at least one of the additional cavities 1007, the metal sheets of the material blank 103, which are provided with separating means, are interconnected for example during the roll bonding process. The region of the additional cavities 1007 which acts for example as a collector is provided with separating means in a larger region of the metal sheets. The collector region is then bent over and flanged, as is shown in step 1003. By means of inflation, regions of different sizes are now formed, for one thing as a collecting line 1007 of the fluid, for example cooling medium, for the heat exchanger 112 and the small cooling channels 111.

For increasing the rigidity of the heat exchanger structure 112 additional hollow channels 1007, ribbing, structures and plateaus can be simply introduced using the previously described method. By means of the bending of the roll bonded metal sheets of the base walls 105-1, 105-2 of the material blank 103, the heat exchanger 112 can be produced in various shapes, for example U-shaped, L-shaped or with staircase-like steps. Furthermore, the structure properties and therefore crash characteristics of the battery carrier 100 can be improved.

Figure 11C:
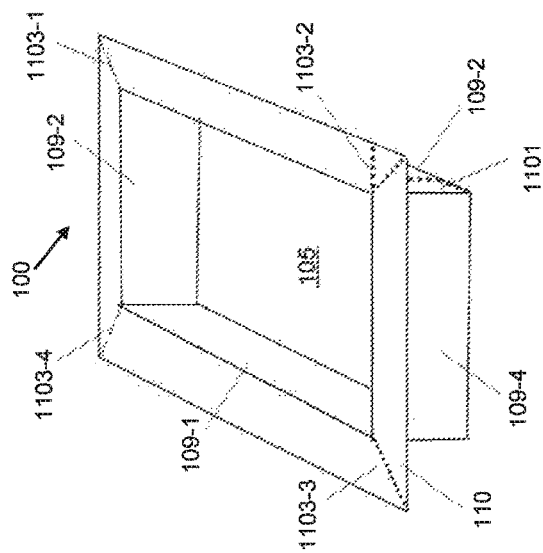
FIGS. 11A, 11B and 11C show examples of the battery carrier.
Figure 11B:
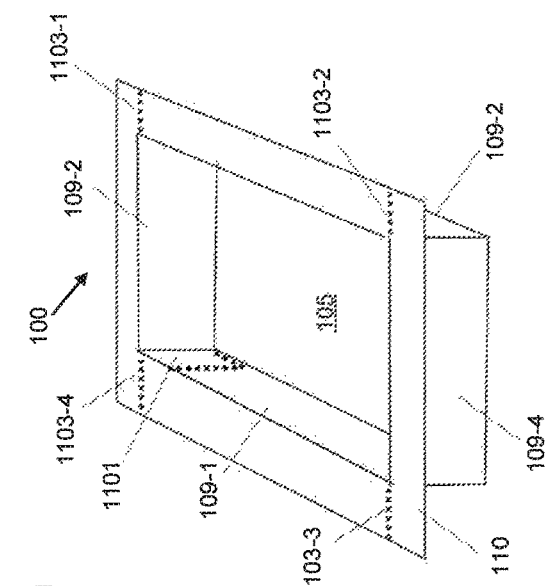
Figure 11A:
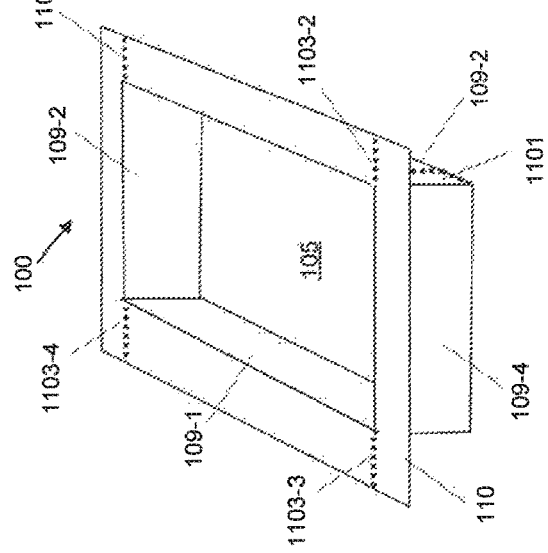

Shown in FIGS. 11A, 11B and 11C are examples of the battery carrier 100 in which the sidewalls 109-1 to 109-4 have been created by means of a bending or folding process of the material blank 103 and then connected in a materially bonding and fluid tight manner. In addition, provision is made for angled joint plates 1101 which are connected to the sidewalls 109-1 to 109-4 in a materially bonding manner.

In the example shown in FIG. 11A, the weld joints 1103-1 to 1103-4 are formed along joining edges which extend parallel to the sidewalls 109-1 to 109-4. The angled joint plates 1101 are folded outwards or arranged on the outside and connected to the respective sidewall 109-1 to 109-4 in a materially bonding manner.

In the example shown in FIG. 11B, the weld joints 1103-1 to 1103-4 are formed along joining edges which extend parallel to the sidewalls 109-1 to 109-4. The angled joint plates 1101 are folded inwards or arranged on the inside and connected to the respective sidewall 109-1 to 109-4 in a materially bonding manner.

In the example shown in FIG. 11C, the weld joints 1103-1 to 1103-4 are formed along diagonally extending joining edges. The angled joint plates 1101 are for example folded inwards or outwards or arranged on the inside or outside and connected to the respective sidewall 109-1 to 109-4 in a materially bonding manner.

Figure 12:
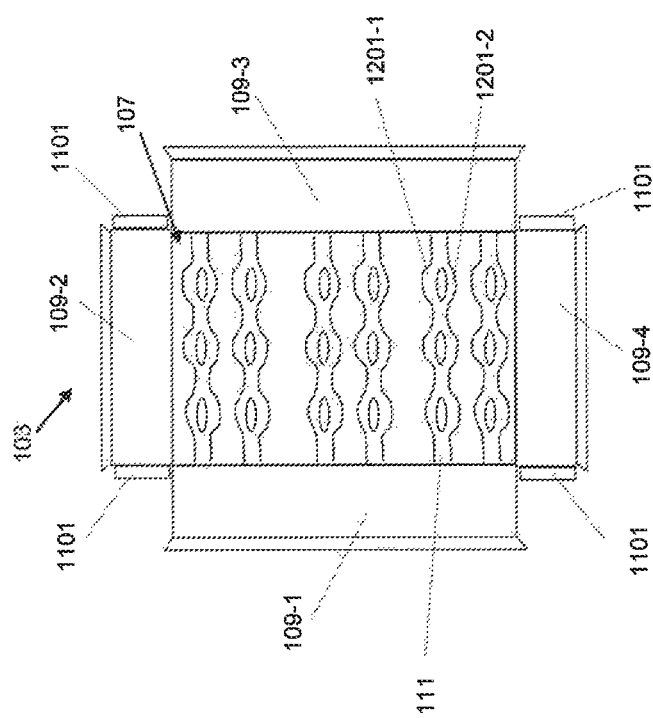
FIG. 12 shows a material blank in one example.

FIG. 12 shows an example of the material blank 103 or roll bonded blank in which the for example fluid-conducting hollow channels 111 are designed in a geometric style of longitudinally extended hollow channel cells.

In one example, in the blank region 107, the hollow channels 111 have honeycomb-like or annular, especially annularly longitudinally extended, hollow channel cells with hollow channel sections 1201, 1201-2, which are fluidically branched in parallel and then joined together. The hollow channels 111 are fluidically separated from each other.

Figure 13:
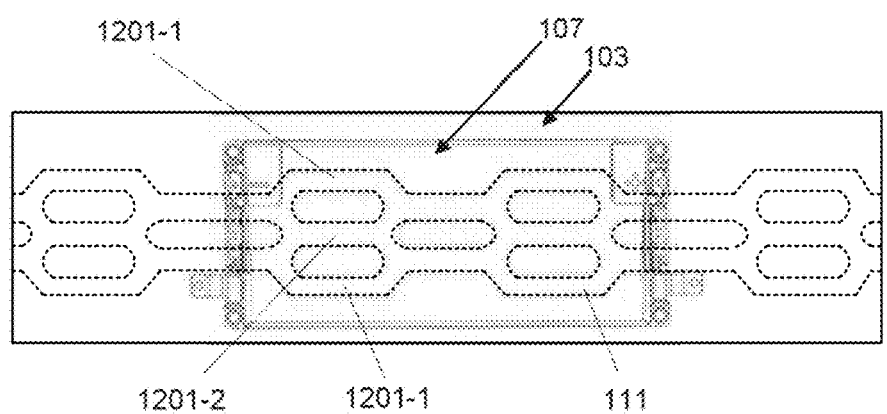
FIG. 13 shows a material blank in one example.

FIG. 13 shows a further example of the material blank 103 in which the for example roll bonded, fluid-conducting hollow channels 111 are designed in a geometric style of longitudinally extended hollow channel cells. In contrast to the example shown in FIG. 13, the hollow channel cells of adjacent hollow channels 111 have at least one common section 1201-2.

The material blank 103 shown in FIG. 13 can be produced from a continuous endless blank, which is shown by way of example, and is able to temperature regulate or cool a battery module, which is indicated here, on the bottom side.

The heat exchanger structure 112 with longitudinally extended cells brings about a laminar flow. For fluid distribution, Y-branches are used over the surface to be cooled of the battery support surface, i.e., of the tray base 105. This structure of the multiple distribution of the fluid flow for the thorough mixing of the flow then resembles a turbulent flow and is accompanied by a low pressure loss. A linked connection of the cells, moreover, simplifies the production of fluid-connecting structures. An improved covering of the battery modules with high stability can also brought about.

In one example, a thermal barrier can be applied to the outer side of the heat exchanger structure 112.

As a result of this, an improved temperature level, especially during winter operation, can be efficiently supported. Moreover, an underride protection or stone guard can consequently also be realised.

The heat exchanger structure 112 in one example can be hot-inflated, for example at temperatures of between 100° C. and 600° C., wherein a separating means, such as titanium oxide which is temperature resistant up to 600° C., can be used. Hot inflation for the arching of the hollow channels 111 is advantageous because the metal sheet of the base walls 105-1 and 105-2 can then be formed more robustly without cracking.

The metal sheets, i.e., the base walls 105-1 and 105-2 of the heat exchanger 112, in one example consist of different materials, such as aluminium and/or steel. In order to achieve increased strength values for the improved integration into the battery housing and therefore improved stability, load bearing capacity and crash requirements of the battery carrier 100, hardenable aluminium materials of 6XXX alloy or non-hardenable aluminium materials of 5082/5083 alloy can be used as an option.

The metal sheets of the base walls 105-1 and 105-2 which are to be connected by means of a roll bonding process can be formed in one example from different sheet thicknesses in each case, wherein the thinner sheet is then formed by the internal pressure as a result of the lower resistance during the inflation. The thicker sheet in each case remains undeformed depending on the pressure application. Furthermore, a backstop, e.g., a pressure ram, can be provided so that the thicker sheet remains undeformed.

Since heat transfer of the battery module to the heat exchanger 112 depends on the sheet thickness of the base walls 105-1 and 105-2 of the heat exchanger 112, the thinner sheet side with the formed out hollow channels 111, for example cooling channels, can be advantageously positioned pointing toward the battery module. The lower, thicker sheet then protects the hollow channels 111 against stone impact.

In an alternative example, for improved load bearing function of the battery modules, the thicker, flat sheet can be arranged pointing towards the battery module, that is to say on the battery side.

In one example, it is advantageous to apply a for example even coating of thermally conduction paste between the battery module and the battery carrier 100 for improved heat transfer.

The hollow channels 111 can be created by means of inflation on one side or both sides. As a result of the inflation on both sides, larger cross sections of the cooling channels are developed. The one-sided inflation of the metal sheets creates semi-circular channel structures.

In order to create different heights of the hollow channels 111, in one example an embossing die with preset height steps can also be used.

For inflation of the hollow channel, compressed air can be used. The diameter of the respective hollow channel 111, e.g., cooling channel, is determined by the duration and pressure level of pressure application and is dependent on sheet thicknesses and material.

What is claimed is:

1. A battery carrier for supporting one or more electric battery modules for an electrically operable vehicle, comprising:
    a support tray formed from a material blank tray that comprises a double-walled tray base configured to support the one or more electric battery modules and double-walled or single-walled sidewalls that delimit the double-walled tray base at opposing sides of the double-walled tray base; and
    a heat exchanger structure with hollow channels formed in the double-walled tray base that are configured to allow a fluid to pass through to regulate a temperature of the one or more electric battery modules,
    wherein each of the hollow channels comprise respective first hollow channel sections that are separated from one another and extend from one end of the double-walled tray base and respective second hollow channel sections that are separated from one another and extend from another end of the double-walled tray base,
    wherein the hollow channels of the heat exchanger structure are of serpentine form or are formed as annularly longitudinally extended cells, wherein the hollow channels comprise third hollow channel sections, that are fluidically branched in parallel from the first hollow channel sections and then join together at fourth hollow channel sections of the hollow channels, and wherein the double-walled material blank is a blank that is assembled using laser welding, soldering, or roller seam welding,
    wherein one wall of the double-walled material blank which faces an interior of the support tray is thicker than a wall of the double-walled material blank which faces away from the interior of the support tray,
    wherein the double-walled tray base provides a flat surface for the mounting of a battery module, wherein the double-walled or single-walled sidewalls have an angled flange in each case, which serves for the fastening of a cover on the support tray,
    wherein one or more first sidewalls of the double-walled or single-walled sidewalls of the support tray are configured with an angled joint plate connected in a materially bonded manner to a second sidewall of the double-walled or single-walled sidewalls of the support tray, wherein the second sidewall adjoins the one or more first sidewalls,
    wherein an opening of a first hollow channel of the hollow channels is provided with a fluid inlet connector, wherein an opening of a second hollow channel of the hollow channels is provided with a fluid outlet connector.

2. The battery carrier according to claim 1, wherein the heat exchanger structure is formed with one or more hollow channels in one or more double-walled sidewalls.

3. The battery carrier according to claim 1, wherein the double-walled material blank is folded to form the support tray.

4. The battery carrier according to claim 3, wherein the double-walled material blank is folded with the heat exchanger structure to form the support tray with double walls.

5. The battery carrier according to claim 3, wherein the heat exchanger structure is mechanically connected to the support tray.

6. A battery carrier for supporting one or more electric battery modules for an electrically operable vehicle, comprising:
- a support tray formed from a double-walled material blank, wherein the support tray comprises a double-walled tray base configured to support the one or more electric battery modules and double-walled or single-walled sidewalls that delimit the double-walled tray base at opposing sides of the double-walled tray base; and
- a heat exchanger structure with hollow channels formed in the double-walled tray base that are configured to allow a fluid to pass through to regulate a temperature of the one or more electric battery modules, wherein the hollow channels of the heat exchanger structure are of serpentine form and have hollow channel sections that are fluidically branched in parallel and then join together, and wherein the double-walled material blank is a blank that is assembled using laser welding, soldering, or roller seam welding, wherein one wall of the double-walled material blank which faces an interior of the support tray is thicker than a wall of the double-walled material blank which faces away from the interior of the support tray, wherein the double-walled tray base provides a flat surface for the mounting of a battery module, and wherein the double-walled or single-walled sidewalls have an angled flange in each case, which serves for the fastening of a cover on the support tray.

7. The battery carrier of claim 6, wherein:
an opening of a first hollow channel of the hollow channels is provided with a fluid inlet connector, and wherein an opening of a second hollow channel of the hollow channels is provided with a fluid outlet connector.

* * * * *

UNITED STATES PATENT AND TRADEMARK OFFICE
CERTIFICATE OF CORRECTION

| | | |
|---|---|---|
| PATENT NO. | : 11,926,244 B2 | Page 1 of 1 |
| APPLICATION NO. | : 16/271420 | |
| DATED | : March 12, 2024 | |
| INVENTOR(S) | : Ludger Gehringhoff et al. | |

It is certified that error appears in the above-identified patent and that said Letters Patent is hereby corrected as shown below:

On the Title Page

In the Foreign Application Priority Data:
Item (30) delete "March 19, 2018" and insert --March 9, 2018--

Signed and Sealed this
Twenty-first Day of May, 2024

Katherine Kelly Vidal
*Director of the United States Patent and Trademark Office*